United States Patent [19]

Komurasaki

[11] Patent Number: 5,070,843
[45] Date of Patent: Dec. 10, 1991

[54] IGNITION TIMING CONTROL APPARATUS OF INTERNAL-COMBUSTION ENGINE

[75] Inventor: Satosi Komurasaki, Himeji, Japan

[73] Assignee: Mitsubishi Denki Kabushiki Kaisha, Tokyo, Japan

[21] Appl. No.: 520,431

[22] Filed: May 8, 1990

[30] Foreign Application Priority Data

May 15, 1989 [JP] Japan .................................. 1-118756
May 29, 1989 [JP] Japan .................................. 1-132853

[51] Int. Cl.⁵ ........................................... F02P 5/145
[52] U.S. Cl. .................................. 123/425; 73/1 DV; 340/515
[58] Field of Search .............................. 123/425, 435; 364/431.08; 73/1 DV, 35 K; 307/10.6; 340/515

[56] References Cited

U.S. PATENT DOCUMENTS

| 4,418,567 | 12/1983 | Böning et al. | 73/35 |
| 4,462,362 | 7/1984 | Bonitz et al. | 123/425 |
| 4,607,602 | 8/1986 | Komurasaki | 123/425 |
| 4,620,446 | 11/1986 | Jensen et al. | 73/1 DV |
| 4,788,957 | 12/1988 | Komurasaki | 123/425 |
| 4,950,915 | 8/1990 | Spies et al. | 340/515 |

FOREIGN PATENT DOCUMENTS

0138263 8/1983 Japan .................................. 123/425
0138264 8/1983 Japan .................................. 123/425

Primary Examiner—Tony M. Argenbright
Assistant Examiner—Robert E. Mates
Attorney, Agent, or Firm—Sughrue, Mion, Zinn, Macpeak & Seas

[57] ABSTRACT

An ignition timing control apparatus for an internal-combustion engine comprises a resonance-type acceleration sensor for detecting vibration acceleration, a discriminating means for eliminating noise signal components from the output of the acceleration sensor and selecting knocking signal components, a reference ignition timing signal generating means for generating a reference ignition timing signal, a phase shifting means for shifting the phase of the reference ignition timing signal in accordance with the output of the discriminating means, a switching means for interrupting power supply to an ignition coil corresponding to the output of the phase shifting means; and an operating condition detecting means for applying a specific voltage to the acceleration sensor, and for verifying the operating condition of the acceleration sensor and the integrity of a connection between the output side of the acceleration sensor and the input side of the discriminating means from the responsiveness of the acceleration sensor to the specific voltage.

1 Claim, 11 Drawing Sheets

IGNITION TIMING CONTROL APPARATUS OF INTERNAL-COMBUSTION ENGINE

BACKGROUND OF THE INVENTION

1. Field of the Invention

The present invention relates to an ignition timing control apparatus for controlling internal-combustion engine knocking.

2. Discussion of Background

An ignition timing control apparatus used in a conventional internal-combustion engine will hereinafter be described with reference to FIG. 11. In the drawing, a numeral 1 is an acceleration sensor mounted in an engine (not illustrated) for the detection of a vibration acceleration of the engine; a numeral 2 denotes a buffer amplifier which receives a signal from the acceleration sensor, and makes an impedance conversion of the signal, then outputting a signal; a numeral 3 represents an analogue gate for blocking a noise part of an output signal of the buffer amplifier which acts as an interference wave on knock detection; a numeral 4 denotes a gate timing controller which indicates the opening and closing of the analogue gate correspondingly to an interference noise generation timing; a numeral 5 denotes a noise level detector which detects the level of mechanical vibratory noise of the engine other than the engine knocking; a numeral 6 denotes a comparator which compares the output voltage of the analogue gate 3 with the output voltage of the noise level detector 5, then generates a knock detection pulse, a numeral 7 designates an integrator which integrates the output pulse of the comparator 6, generating an integrated voltage corresponding to a knocking strength, a numeral 8 denotes a phase shifter which shifts the position of a reference ignition signal in accordance with the output voltage of the integrator 7, a numeral 9 denotes a rotation signal generator which generates an ignition signal corresponding to present ignition advance characteristics; a numeral 10 denotes a shaping circuit which shapes an output waveform of the rotation signal generator 9, simultaneously controlling the circuit closing angle of power applied to an ignition coil 12; and a numeral 11 designates a switching circuit which interrupts power being fed to the ignition coil by the output signal of the phase shifter 8.

Figure 12:
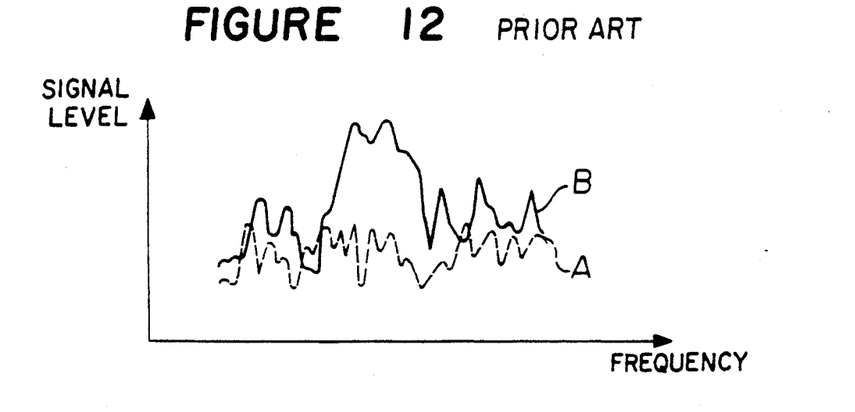
FIG. 12 is the vibration characteristics diagram of the engine.

FIG. 12 shows the vibration frequency characteristics of this engine. In this drawing, a character A indicates the frequency characteristics without occurrence of knocking, and a character B with knocking. This engine vibration includes, beside a knock signal (a signal generated along with knocking), mechanical noise of the engine. In FIG. 12, it is understood from a comparison between A and B that the knock signal has peculiar frequency characteristics. Therefore, its distribution differs with an engine used or with a difference in the mounting position of the acceleration sensor, and besides, in either case, there is a distinct difference with the presence or absence of engine knocking. It is, therefore, possible to control other frequency components and efficiently detect the knock signal by detecting the vibratory acceleration of the engine by the acceleration sensor 1 having a natural vibration frequency plus the frequency components of the knock signal.

Figure 11:
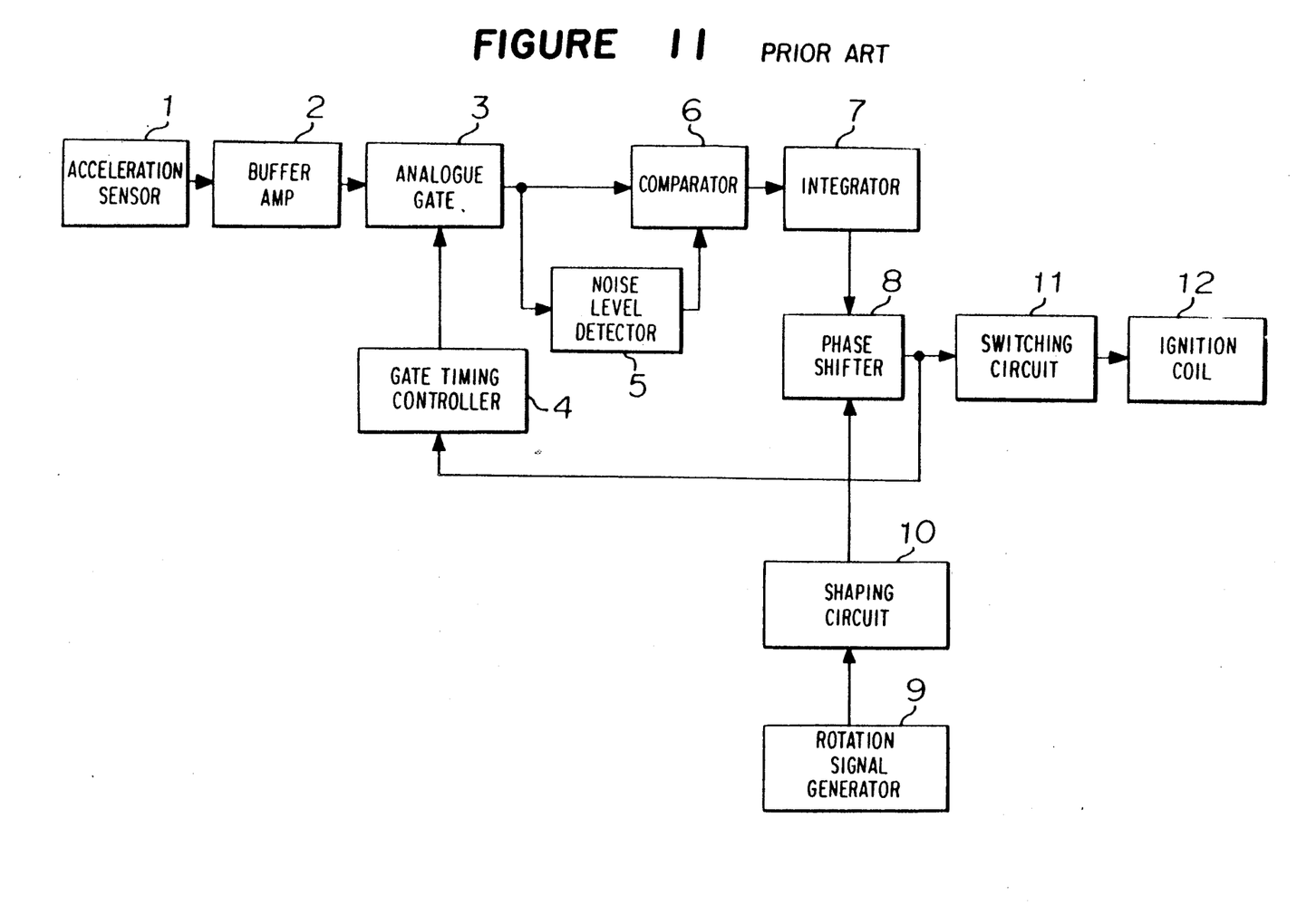
FIG. 11 is a block diagram showing the constitution of the conventional ignition timing control apparatus of internal-combustion engine.
Figure 13A:
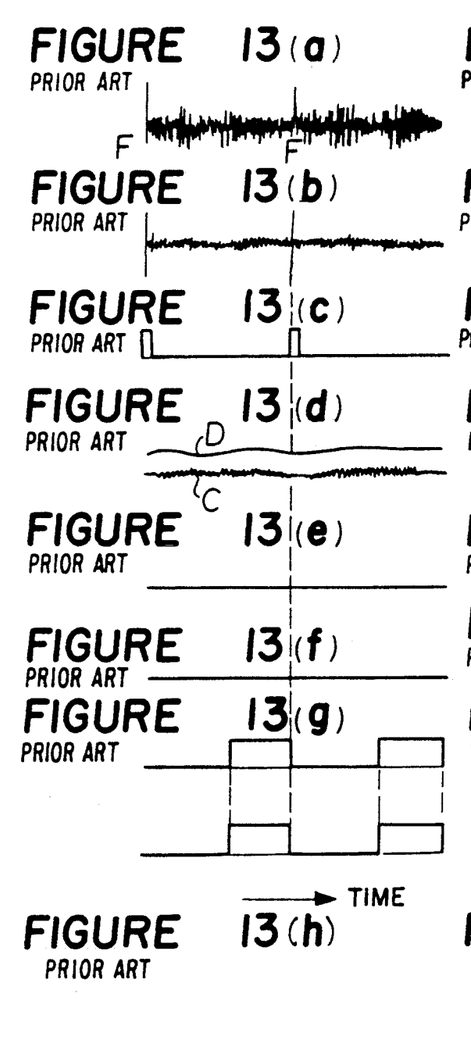
Figure 14A:
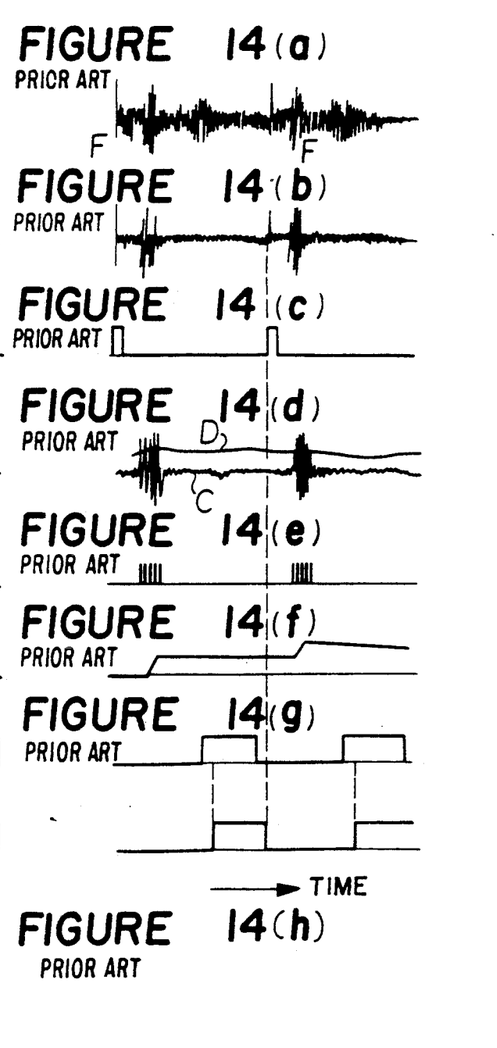

FIGS. 13 and 14 show the operation waveform of each part of the conventional device of FIG. 11. FIG. 13 shows the mode of engine operation without knocking, and FIG. 14 shows the mode of engine operation accompanied by knocking. The operation of the conventional device shown in FIG. 11 will be described with reference to FIGS. 13 and 14. The ignition signal produced by the rotation signal generator 9 is shaped by the shaping circuit 10 to an opening-closing pulse having a desired circuit closing angle correspondingly to the ignition timing characteristics preset in accordance with the engine speed. The switch circuit 11 is driven through the phase shifter 8, thereby interrupting the power feed to the ignition coil 12. The engine is ignited by ignition voltage of the ignition coil 12 that is generated when the current is interrupted, thus being operated. Engine vibration occurring during engine operation is detected by the acceleration sensor 1.

When the engine is not knocking, no engine vibration by knocking is generated. However, a mechanical noise shown in FIG. 13(a) appears in the output signal of the acceleration sensor 1 due to the presence of other mechanical vibration. This mechanical vibration is selectively changed into an electric signal by the acceleration sensor 1 having the natural vibration frequency plus the knock signal frequency.

The mechanical noise component of this signal is controlled considerably as shown in FIG. 13(b). However, the ignition noise component, or an electric noise overlapping therewith, being powerful, is outputted at a high level. In this case, it is likely that the ignition noise is mistaken for a knock signal, and therefore the analogue gate 3 is closed for a period of time from an ignition timing by the output (FIG. 13(c)) of a gate timing controller 4 which is triggered by the output of the shape shifter 8, interrupting the ignition noise. In the output of the analogue gate 3 only a low-level mechanical noise will remain as shown at C of FIG. 13(d).

In the meantime, the noise level detector 5 is designed to respond to a change in the peak value of the output signal of the analogue gate 3. In this case, the noise level detector 5 has the characteristics capable of responding to a relatively mild change in the peak value of normal mechanical noise, producing a slightly higher dc voltage than the peak value of the mechanical noise (D of FIG. 13(d)).

Therefore, since the output of the noise level detector 5 is greater than a mean peak value of the output signal of the analogue gate 3 shown in FIG. 13(d), the output of the comparator 6 which compares them is not produced as shown in FIG. 13(e), with the result that all the noise signal is eliminated.

With the output voltage of the integrator 7 remaining at zero as shown in FIG. 13(f), a phase angle (a phase difference of input and output in FIGS. 13(g), (h)) will become zero.

Therefore, the opening-closing phase of the switching circuit 11, or the power interruption phase of the ignition coil 12, which is driven by this output, will become of the same phase as the reference ignition signal of the output of the shaping circuit 10, the ignition timing becoming the reference ignition timing.

When knocking has occurred, the output of the acceleration sensor 1 includes a knock signal in the vicinity of a time delaying from the ignition timing as shown in FIG. 14(b); the signal that has passed the analogue gate 3 comprises a mechanical noise largely overlapped by a knock signal as shown in FIG. 14(d).

Of the signal that has passed through this analogue gate 3, the knock signal rises sharply, and therefore the output voltage level of the noise level detector 5 delays responding to the knock signal. In consequence, the input of the comparator 6 will become as shown in C and D of FIG. 14(d), and therefore there is generated a pulse with the output of the comparator 6 as shown in FIG. 14(e).

The integrator 7 integrates the pulse thereof, generating an integration voltage as shown in FIG. 14(f). Since the phase shifter 8 shifts towards the time delay side the output signal (FIG. 14(g) (Reference ignition signal)) of the shaping circuit 10 in accordance with the output voltage of the integrator 7. The output of the phase shifter 8 delays shifting phase as compared with the phase of the reference ignition signal of the shaping circuit 10, driving the switching circuit 11 in phase shown in FIG. 14(h). Consequently, the ignition timing delays, with the result that knocking is restrained. The repetition of these conditions shown in FIGS. 13 and 14 achieves the optimum ignition timing control.

Subsequently, the acceleration sensor 1 will be explained with reference to FIG. 15. In this drawing, a numeral 21 denotes a metal base provided with a screw section 21a for mounting this vibration detector to a part to be detected, for holding a vibration detecting section described below. A numeral 22 is a metallic diaphragm comprising a vibration detecting section together with a piezoelectric element 22 which transforms vibrations into an electrical signal; a numeral 24 is a lead wire for leading out the detection output of the piezoelectric element 23, a numeral 25 represents a molded plastic cover joined with the base 21 for closing the vibration detecting section, at a caulked section 21b of the base 21, a numeral 26 expresses a terminal, which is installed integral with the cover 25 by an insert molding method, for leading the detection output out of the detector. A numeral 26a denotes a locking piece, which is a part of the terminal 26 bent to lock the cover 25 from accidental removal and rotation. The diaphragm 22 and the piezoelectric element 23 are joined together with an electrically-conductive adhesive and therefore an electrode on the bonded side of the piezoelectric element 23 becomes of the same potential as the base 21.

Next, an explanation will be made on detecting operation. This detector is mounted to the part to be detected, by tightening the threaded section 21a of the base 21 and will receive vibration. This vibration passes to the diaphragm 22 joined at the caulked section 21a of the base 21. This diaphragm 22, together with the piezoelectric element 23, has a good sensitivity, quickly responding to the vibration of preset natural vibration frequency and applying distortion to the piezoelectric element 23. The piezoelectric element 23 outputs an electric signal corresponding to the distortion with reference to the electrode on the joined surface side, detecting vibrations as an electric signal. This electric signal is led out of the detector through the lead wire 24 and the terminal 26.

In the conventional knocking control device of an internal-combustion engine as described above, there was a problem that various troubles of signal lines in the acceleration sensor 1 or between the sensor and the buffer amplifier 2 can not easily be detected.

Next, this problem will be described by referring to FIG. 16. In this drawing, numerals 2, 23 and 26 designate the buffer amplifier, the piezoelectric element and the terminal respectively. A numeral 2a denotes an input terminal (the input terminal of the knock control circuit) of the buffer amplifier 2; a numeral 2b expresses an amplifier comprising the buffer amplifier 2; a numeral 31 represents a signal line installed between the terminal 26 and the input terminal 2a of the acceleration sensor 1 to input the detection signal to the amplifier 2b; a numeral 32 is a resistor connected between the input terminal 2a and the circuit power source of the buffer amplifier 2; a numeral 33 is a short-circuit line between the signal line 31 and the ground; and a numeral 34 is a circuit-opening point produced to open the signal line 31.

Figure 16A:
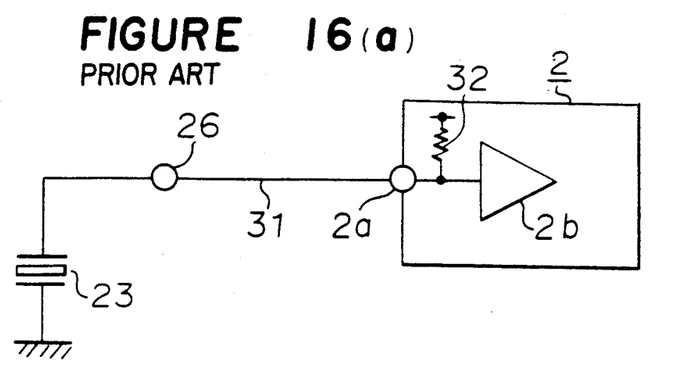

In FIG. 16(a), the detection signal from the piezoelectric element 23 which shows a normal state is outputted through the terminal 26, being inputted to the input terminal 2a of the buffer amplifier 2 through the signal line 31. In the meantime, since the resistor 32 is connected between the circuit power source and the input terminal 2a, the bias is being applied to the piezoelectric element 23 from the input terminal 2a through the signal line 31. Here, the piezoelectric element 23 functions as an electric element capacitor, and therefore all of the input terminal 2a, the signal line 31 and the terminal 26 are applied with the circuit power voltage.

Figure 16B:
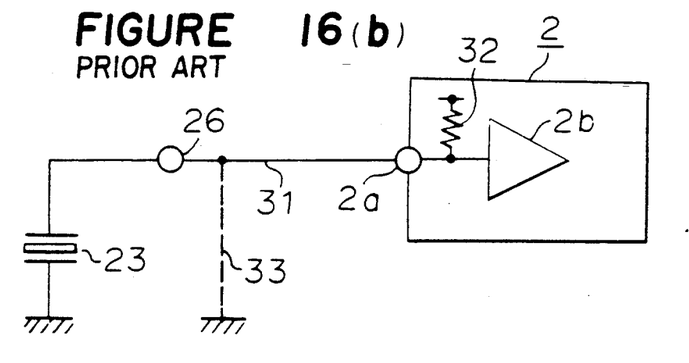

FIG. 16(b) shows the buffer amplifier circuit shorted to the ground (for example a short-circuit between the electrodes of the piezoelectric element 23) of the same potential as the terminal 26 of the acceleration sensor 1 or the signal line 31 shorted to the ground. That is, this drawing shows a trouble that a shorted line 33 has occurred, shorting the signal line 31 to the ground. In this case, the input terminal 2a is shorted to the ground, the occurrence of a trouble being detected from a change in the input potential of the buffer amplifier 2. Accordingly, when the electric potential at the input terminal 2a is decreased to the ground potential, or lower than a specific voltage, by the fail detection circuit, which is not illustrated, a fail signal must be generated. This fail signal drives for example the integrator 7, retarding the ignition timing in order to prevent the occurrence of knocking and accordingly enabling safe operation of the engine without knocking in the event that knocking can not be detected.

Figure 16C:
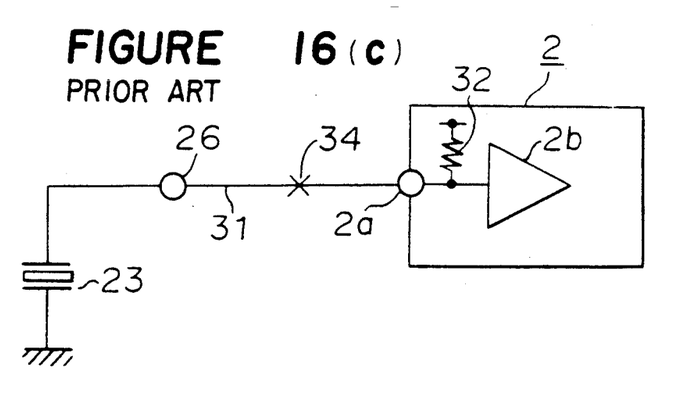

FIG. 16(c) shows a disconnection (open circuit) in a section of the same potential as the terminal 26 in the acceleration sensor 1, or disconnection of the signal line, or the opening of the connector circuit used for their connection. Now the disconnection of the signal line 31 is shown.

Since the piezoelectric element 23 is a capacitor, the electric potential at the input terminal 2a in this case will not vary from the circuit power supply voltage of the buffer amplifier 2. Namely, no abnormality can be detected.

It, however, is seen from our experience that a trouble most frequently experienced in the market is the opening of a circuit caused by this disconnection.

Figure 17:
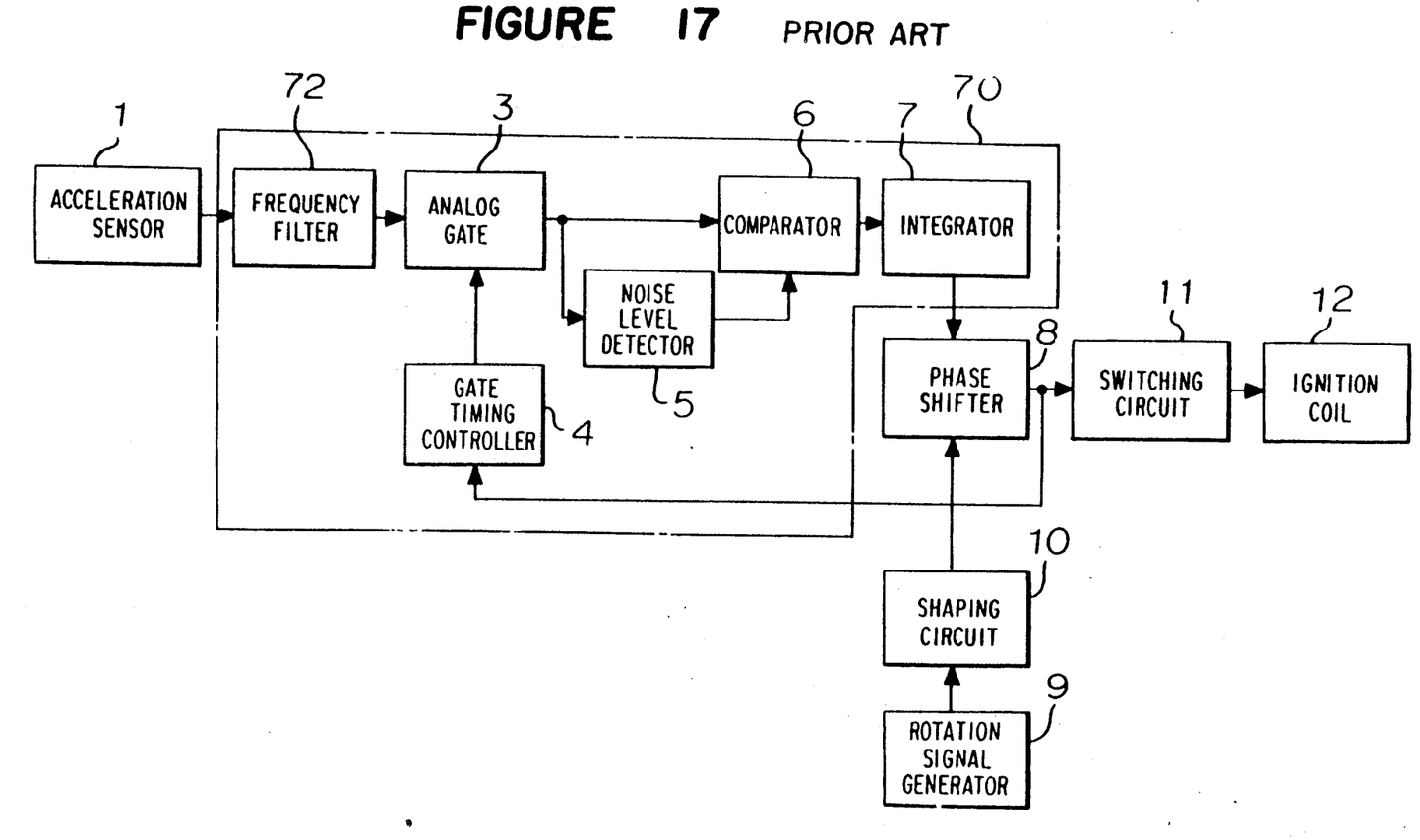
FIG. 17 is a block diagram showing the constitution of the conventional ignition timing control apparatus of internal-combustion engine.

The ignition timing control device of the internal-combustion engine shown in FIG. 17 is also a known art. This device is identical to the conventional device shown in FIG. 11 except for the use of a frequency filter 72 in place of the buffer amplifier 2. The frequency filter 72 allows the passage of the part of the output signal of the acceleration sensor 1 that is sensitive to knocking. The operation waveform of each constitutive part of the device and the vibration frequency characteristics of the engine both shown in FIG. 17 are the same as those shown in FIGS. 12 to 14 and therefore are not described hereinafter. In FIG. 17, a numeral 70 denotes a knock detecting section including members from the frequency filter to the integrator.

Generally, in the internal-combustion engine, knocking is likely to occur on starting or during acceleration. Under other operating conditions, or in a no-control range, no knocking occurs. In most cases, the engine is normally operated in the no-control range, and accordingly the knock control section remains stationary. The integrator 7 in FIG. 17 is in its normal reference state of operation when not producing an output. That is, under most of its operating conditions the integrator 7, when normal, does not output. It is, therefore, difficult to judge from this output whether the integrator 7 is normal or abnormal, that is, whether the knock detecting section 70 is normally operating.

In the meantime, since factors generating the knocking vary in the knock control range, it is not easy to judge, only from operating information used for detection and control, whether or not each part is in a desired normal condition.

If the knock detecting section 70 is malfunctioning, no proper knocking control can be effected, sometimes resulting in a failure of the engine. The malfunctioning of this device is very dangerous.

The conventional ignition timing control device of internal-combustion engine has such a problem that if the operating condition of the knock detecting section can not easily be confirmed or the knock detecting section is malfunctioning, no desirable knock control can be achieved, resulting in worsened feeling caused by knocks, an engine failure, degraded merchantability, a functional loss, and further in a danger to induce a fatal accident.

SUMMARY OF THE INVENTION

The present invention has been accomplished in an attempt to solve the problem and therefore it is an object of the present invention to provide a knock control device of an internal-combustion engine adapted to detect such a trouble as the disconnection (opening of circuit) of the signal line within the acceleration sensor and between the control circuits and at the connector section, or shorting to the ground, by inputting an ac signal from the control circuit side to the acceleration sensor and detecting the terminal voltage of the acceleration sensor.

It is another object of the present invention to provide an ignition timing control device of the internal-combustion engine which is capable of detecting a trouble of the knock detecting section.

According to the present invention, there is provided an ignition timing control apparatus of internal-combustion engine comprising a resonance-type acceleration sensor which detects the vibration acceleration; a discriminating means which eliminates noise signal components from the output of this acceleration sensor and selects knocking signal components; a reference ignition timing signal generating means which generates a reference ignition timing signal; a phase shifting means which changes the phase of the reference ignition timing signal in accordance with the output of the discriminating means; a switching means which interrupts the power supply to the ignition coil correspondingly to the output of this phase shifting means; and an operating condition detecting means which applies a specific voltage to the acceleration sensor, and verifies an operating condition of the acceleration sensor and the connection between the output side of the acceleration sensor and the input side of the discriminating means from the responsiveness of the acceleration sensor at this time.

Furthermore, according to the present invention, there is provided an ignition timing control apparatus of internal-combustion engine comprising a knock sensor which detects engine knocking information; a knock discriminating means which selects a knock signal produced in the engine, from this knock sensor output; a control means which generate a control signal in accordance with the knock signal; a signal generating means which generates an ignition signal; an ignition timing control means which controls the ignition signal in accordance with the control signal; a switching means which controls the power supply to the ignition coil; and a fail means which generates a fail signal in case of a malfunction of each part of these means; wherein the ignition timing control apparatus is adapted to generate the control signal from the control means within the range no knocking control is effected.

Other objects, features and advantages of the present invention will become apparent from the following description of embodiments of the present invention, together with the accompanying drawings.

BRIEF DESCRIPTION OF THE DRAWINGS

FIGS. 13(a-h) and 14(a-h) are operation waveform diagrams of parts shown in FIG. 11;

FIGS. 16(a-c) are a principle diagram of the abnormality detecting circuit of a conventional device.

DESCRIPTION OF THE PREFERRED EMBODIMENTS

Hereinafter preferred embodiments of an ignition timing control device according to the present invention will be described with reference to the accompanying drawings.

The characteristics of the acceleration sensor based on the present invention will be explained with reference to FIGS. 3 and 4.

Figure 3:
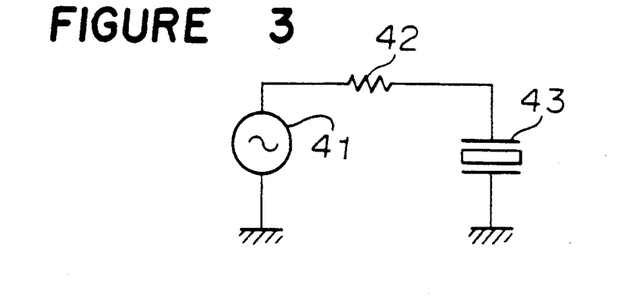
FIGS. 3 to 7 are diagrams explaining the principle of the present invention.

In FIG. 3, a numeral 41 denotes an oscillator which generates an ac signal; a numeral 42 represents a resistor with its one end connected to the output side of the oscillator 41; and a numeral 43 is a piezoelectric element in the acceleration sensor. Characteristics obtained by measuring the voltage between the terminals of the piezoelectric element 43 with the output frequency of the oscillator 41 changed under this condition are shown in FIG. 4. At a frequency $f_0$ the voltage between the terminals of the piezoelectric element 43 decreases. The piezoelectric element 43 functions as a capacitor, but is used as a material which forms a vibration-electricity converter of the acceleration sensor 1, serving as an important material to set a natural frequency $f_0$. Since the vibration converter section comprising the piezoelectric element 43 makes a resonant vibration when the frequency of a signal outputted by the oscillator 41 coincides with the natural frequency $f_0$, the impedance between the terminals of the piezoelectric element 43 decreases, thus reducing the voltage between the terminals below the voltage Vr. In the event of a disconnection between the resistor 42 and the piezoelectric element 43, the terminal voltage at one end of the resistor 42 on the piezoelectric element 43 side remains constant regardless of frequency as shown in FIG. 5.

Figure 6:
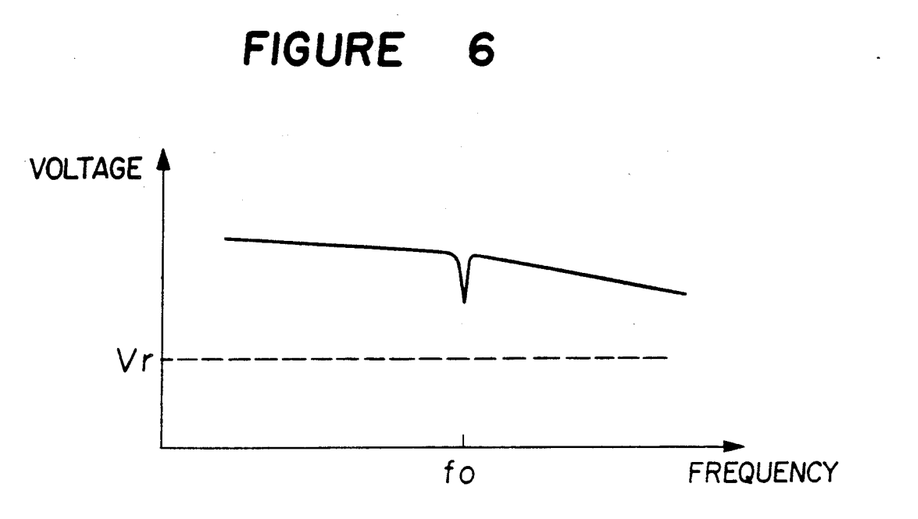
Figure 15:
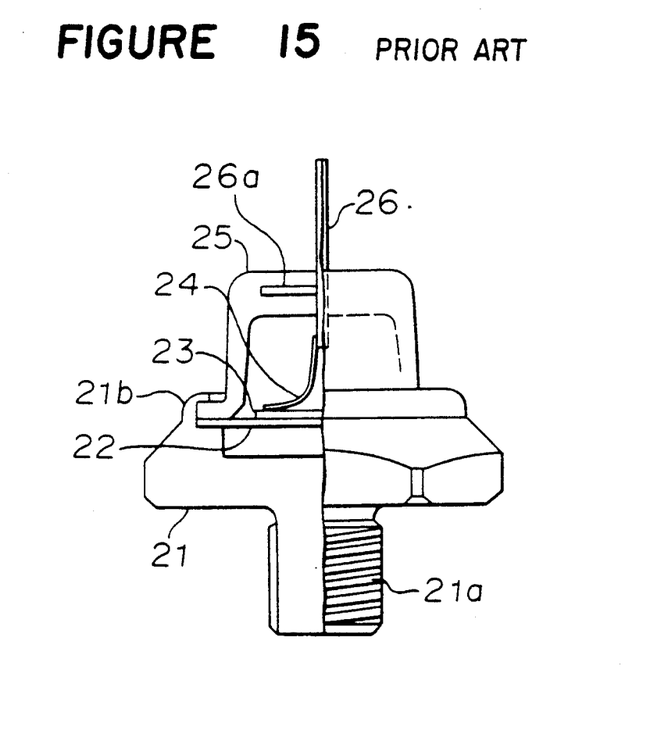
FIG. 15 is a sectional view of the acceleration sensor.

FIG. 6 gives one example of abnormality of the vibration-electricity converter section in the acceleration sensor resulting from some cause (for example, in FIG. 15, deteriorated characteristics of the piezoelectric element 23, or increased resistance at the connection of the piezoelectric element 23 and the lead wire 24). In this example, the degree of resonance here lowers notwithstanding the natural frequency $f_0$ is normally at a preset value. Consequently, the voltage between the terminals of the piezoelectric terminals 43 will never drop below Vr.

Figure 7:
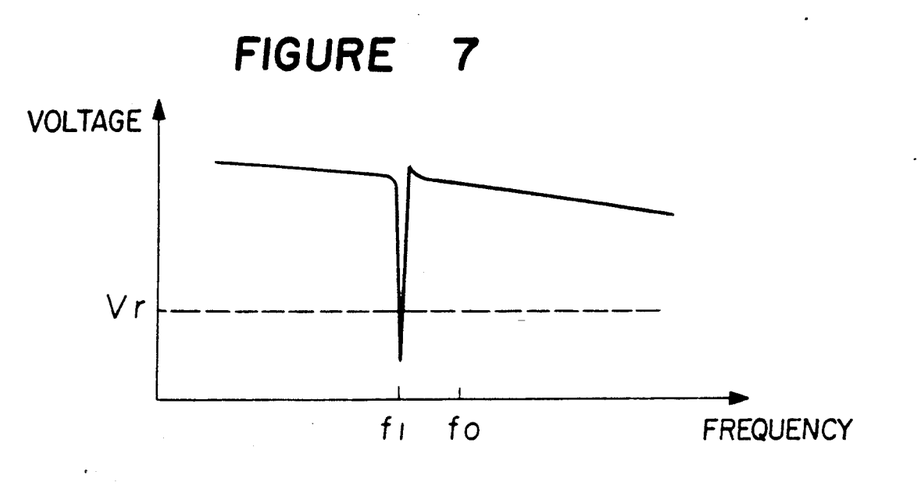

FIG. 7 shows another abnormal condition, in which the natural frequency at the vibration-electricity converter section has become a frequency $f_1$, being off the preset frequency $f_0$.

The present invention is intended to positively confirm the condition of the acceleration sensor itself from the knock control circuit side and also the condition of the signal line between the knock control circuit and the acceleration sensor by utilizing electric characteristics when an ac signal is applied from outside to the acceleration sensor described above.

Hereinafter one embodiment of the present invention will be explained with reference to FIG. 1. In this drawing, a numeral 1 denotes the acceleration sensor shown in FIG. 11; a numeral 51 designates the knock control section constituted of the buffer amplifier 2 to the ignition coil 12 shown in FIG. 11; a numeral 52 designates an oscillator; a numeral 53 expresses a resistor connected in series with the output of the oscillator a numeral 54 designates a switch connected between the input (connected to the output of the acceleration sensor 1) of the buffer amplifier 2 of the knock control section 51 and the resistor 53; a numeral 55 designates a voltage detector which receives a signal of the connection between the resistor 53 and the switch 54 and measures its voltage; a numeral 56 denotes a comparator which compares the output of the voltage detector 55 with the voltage of a reference voltage source 57, a numeral 58 designates a switch connected between the output of the comparator 56 and the knock control section 51; a numeral 59 designates a switch controller for controlling the opening and closing of the switches 54 and 58. Here the oscillator 52 generates an output at a fixed natural frequency $f_0$ of the acceleration sensor 1, thereby detecting the occurrence of abnormality shown in FIGS. 5 and 6.

Next, operation will be explained. The acceleration sensor 1 to the knock control section 51 perform the same operation as the knock control device shown in FIG. 11 to make knocking control. The operation of these devices are not directly related with the present invention and therefore will not be described.

When the engine is started, for example when the ignition switch is turned to on (the engine is standing still and the acceleration sensor 1 is not detecting vibration of the acceleration-sensor 1), or when the engine is idling (the engines rotating, and the acceleration sensor 1 is detecting vibration, but because of a low engine speed, little vibration is occurring), the switch controller 59 controls the switch 54 to close the contact thereof. The ac signal from the oscillator 52 is applied to the acceleration sensor 1 through the resistor 53, and the voltage detector 55 detects the voltage at the output terminal of the acceleration sensor 1 (the output of the piezoelectric element 23 of the vibration-electricity converter section). This detected voltage is compared by the comparator 56 with the reference voltage Vr from the reference voltage source 57.

The oscillator 52 outputs an ac signal fixed at a set natural frequency $f_0$ of the acceleration sensor 1, and the voltage detector 55 detects the voltage of the signal of this frequency $f_0$ through a smoothing or peak value hold device, then outputting the voltage detected.

Figure 4:
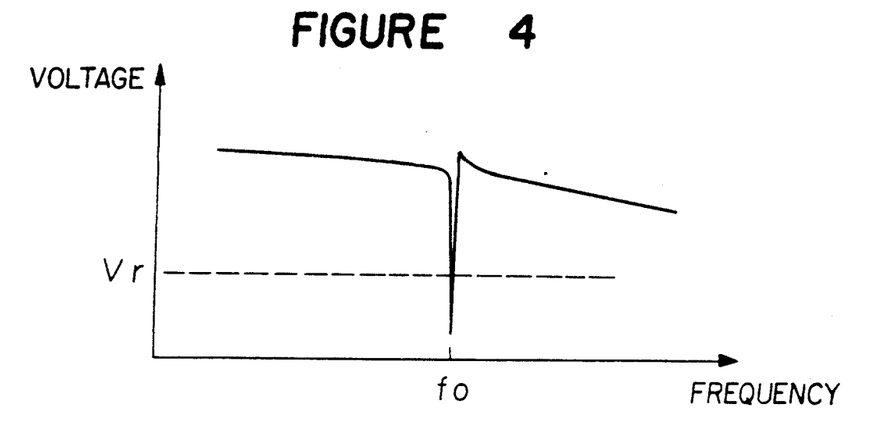
Figure 5:
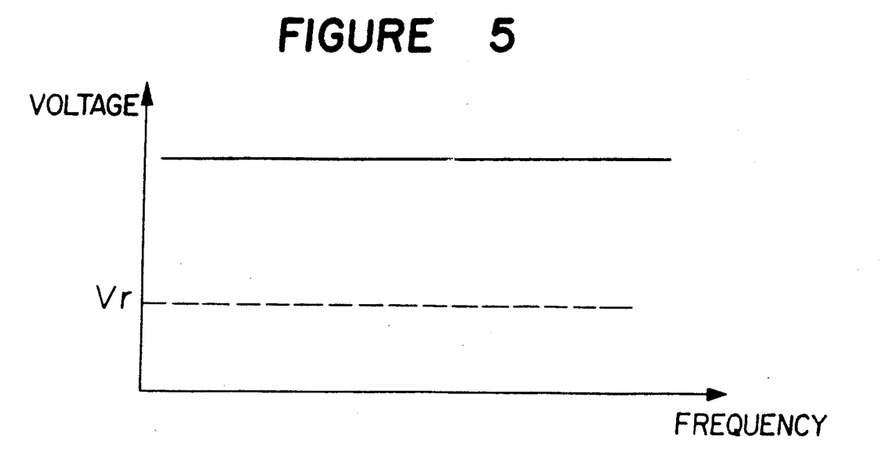

When the vibration-electricity converter section of the acceleration sensor 1 is normally operating and the signal line between the acceleration sensor 1 and the knock control section 51 is in a normal condition, the voltage at the output terminal of the acceleration sensor 1 becomes as shown in FIG. 4 and therefore the voltage detector 55 detects the voltage below the reference voltage Vr. However, in the event of a disconnection of the signal line described above, the terminal voltage will be as shown in FIG. 5 or in the event of deteriorated characteristics of the vibration-electricity converter section, the terminal voltage will become as shown in FIG. 6. Therefore, the voltage detector 55 detects an output terminal voltage above the reference voltage Vr. The comparator 56 receives, from the voltage detector 55, the voltage corresponding to the terminal voltage shown in FIGS. 4 to 6, and compares the voltage with the reference voltage Vr from the reference voltage source 57, thus outputting a fail signal in case an abnormality shown in FIG. 6 has been detected. This fail signal is inputted to the knock control section 51 through the switch 58, from which is driven for example the integrator 7 to generate an integrated voltage, setting the ignition timing at which no knocking will occur.

Figure 1:
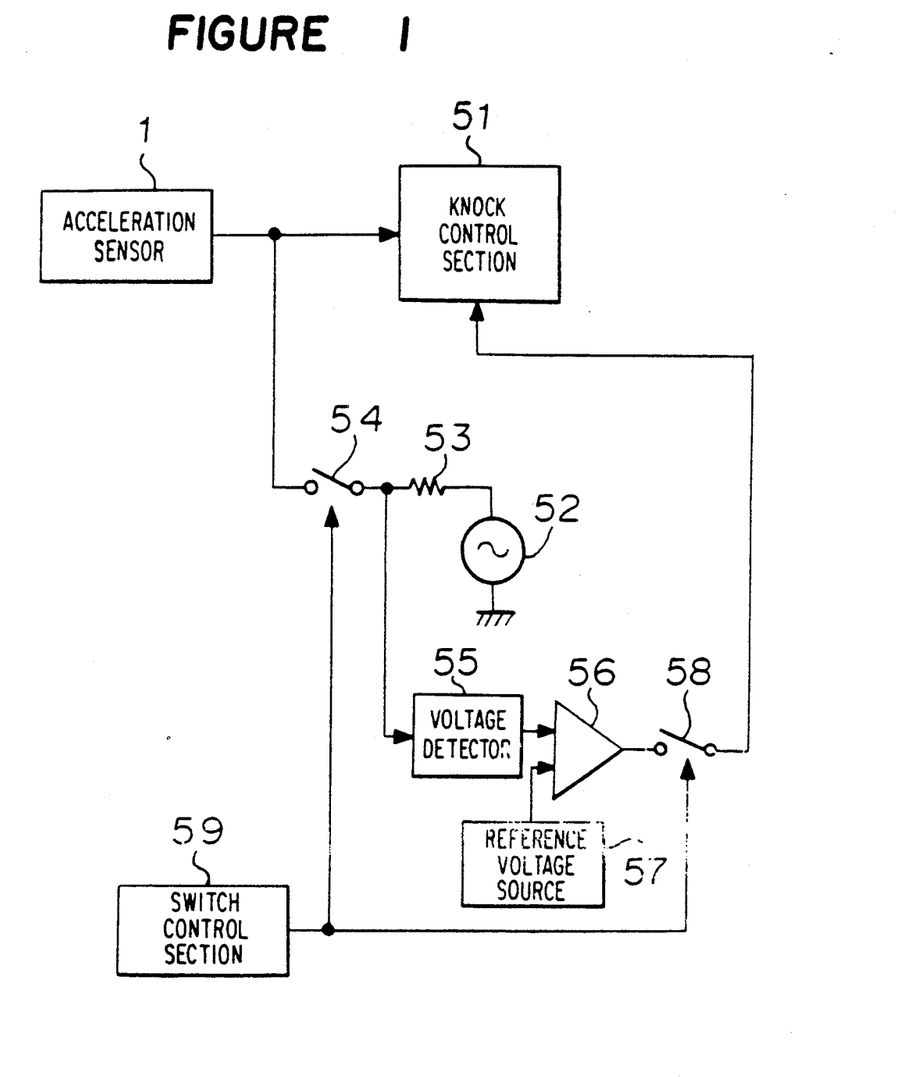
FIG. 1 is a block diagram of an ignition timing control apparatus of internal-combustion engine according to one embodiment of the present invention.

In the embodiment of FIG. 1, the oscillator 52 outputs only a signal of the frequency $f_0$, and accordingly an abnormality can be detected only at this frequency. Next, an explanation will be made on another embodiment that is capable of confirming the presence of a natural frequency within the range of a specific frequency by sweeping in both directions with the set natural frequency $f_0$ of the acceleration sensor 1 set at the center.

Figure 2:
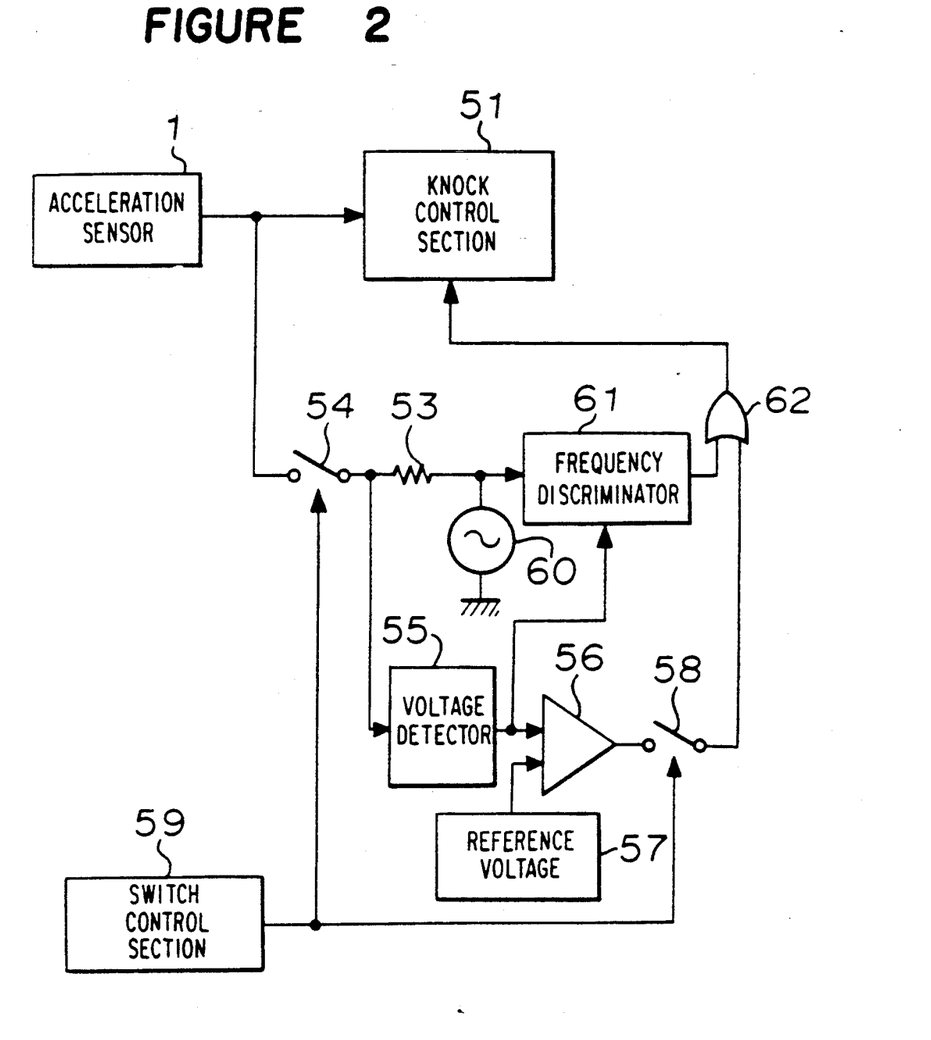
FIG. 2 is a block diagram of the ignition timing control apparatus of internal-combustion engine according to another embodiment of the present invention.

In FIG. 2, numerals 1, 51 and 53 through 59 are the same as those shown in FIG. 1, which therefore will not be described. A numeral 60 denotes an oscillator capable of sweeping the generated frequency within a specific range; a numeral 61 denotes a frequency discriminator, which obtains the minimum voltage point from the output of the voltage detector 55, and obtains the frequency of this minimum voltage point from the output of the oscillator 60, then outputting a fail signal indicating that this frequency is out of the specific frequency range. A numeral 62 designates an OR circuit, which operates to output a fail signal from the frequency discriminator 61 and the comparator 56.

Next, operation will hereinafter be described. The frequency discriminator 61 functions to detect from the output of the comparator 56 a minimum point that the terminal voltage of the acceleration sensor 1 has reached, thus obtaining from the oscillator 60 the frequency of the signal applied at this time. For example, as shown in FIG. 6, if the natural frequency at the vibration-electricity converter section of the acceleration sensor 1 is not at the set value $f_0$ but is at a low value $f_1$, the output voltage of the voltage detector 55 reaches the minimum value at the oscillation frequency $f_1$ of the oscillator 60. The frequency $f_1$ at the minimum point of this voltage is obtained by the frequency discriminator 61. When this frequency $f_1$ exceeds the permissible range of the set natural frequency $f_0$, a fail signal will be outputted.

When the acceleration sensor is used as a knock sensor for detecting a knock signal, a tolerance on the natural frequency $f_0$ is commonly at the level of ±1 kHz or less.

The comparator 56 outputs a fail signal when the output voltage of the comparator 55 has exceeded the reference voltage Vr as in the case of the embodiment of FIG. 1. In the embodiment of FIG. 2, in addition to the vibration of the natural frequency $f_1$ as shown in FIG. 7, the degree of resonance at the frequency lowers and a fail signal is outputted when the voltage has exceeded the reference voltage Vr.

In the above description, no explanation has been made on the shorting to the ground of the interior of the acceleration sensor 1 or of the signal line between the acceleration sensor 1 and the knock control section 51. In this case, however, the signal level of the knock control section 51 becomes zero; therefore it is desired that the comparator 56 functions as a wind comparator, comparing voltage with a reference voltage set in the vicinity of zero voltage and the reference voltage Vr described above. It is easy to solve this problem through a technological means.

The oscillator 52, 60 stated above generates an ac signal, but is not limited thereto. The ac signal may be overlapped with a dc signal because it is possible to utilize the characteristics that the vibration-electricity converter section of the acceleration sensor 1 responds ac components.

The switch 58 is provided so that the output of the comparator 56 will be connected to the knock control section 51 only when judgment is made and that the accidental input of a fail signal will be prevented. This danger can be prevented if only the comparator 56 itself or each part of this comparator on the input side is properly controlled. For the switch controller 59 it is desired to set operation modes on the basis of various sensor information based on the operation range or the operation of the switch 58.

Fail judgment is effected within a range where no knock control is made, and with its judgment output (fail signal) stored, effective fail control may be operated within a specific knock control range.

Performing the fail judgment within the knock control range gives no effect to knock control, but system design can be done much easier for judgment within a range no knock control is done. However, since fail control is imperative for the knock control range, the judgment output should be stored such that the fail signal may be effectively reflected within the knock control range.

According to the above-described embodiment of the present invention, such an abnormality as the disconnection of the acceleration sensor itself and the signal line between the acceleration sensor and the control circuit, and a short circuit to the ground can be detected and furthermore a variation in acceleration sensor detecting characteristics can be checked.

Figure 8:
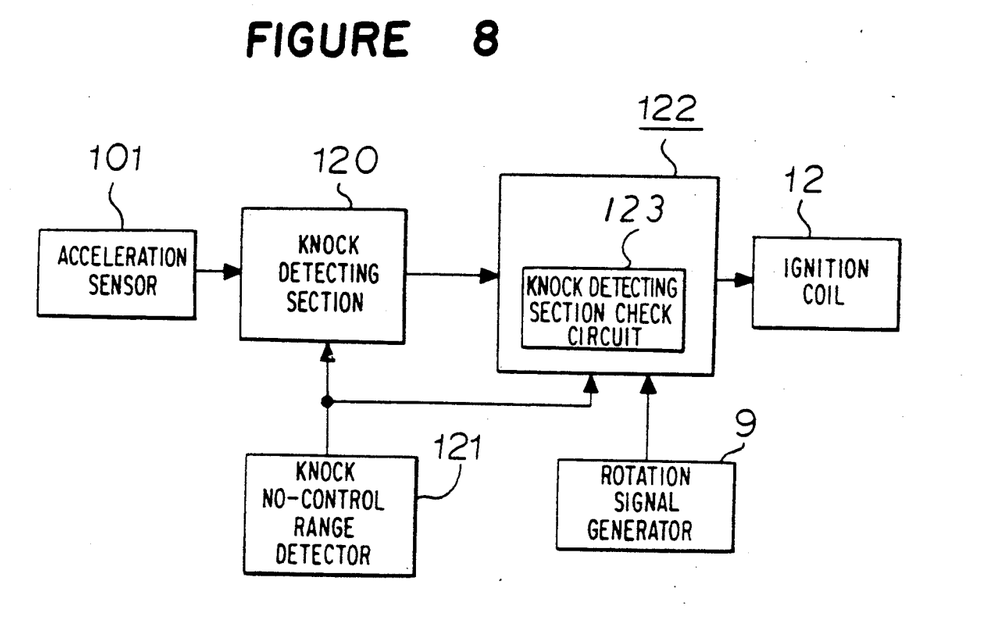
FIG. 8 is a block diagram of the ignition timing control apparatus of internal-combustion engine according to another embodiment of the present invention.

FIG. 8 is a block diagram showing the constitution of the ignition timing control apparatus of internal-combustion engine according to another embodiment of the present invention. In this drawing, a numeral 120 denotes a knock detecting section, which has component elements ranging from a frequency filter 72 to an integrator 7 of a conventional device. A numeral 121 denotes a knock no-control range detector which detects a knock no-control range in which no knock control is performed; a numeral 122 designates an igniter section including the shaping circuit 10, the phase shifter 8 and the switching circuit 11; and a numeral 123 designates a knock detecting section check circuit which detects the output of the knock detecting section 120 and judges whether or not it is in a normal operating condition.

Next, operation will be explained. The knock no-control range detector 121 detects that the engine is operating within the knock no-control range, controlling such that the knock detecting section 120 will output. For example, a signal equivalent to a knock signal generated by the comparator 6 is inputted into the integrator 7, or one input of the comparator 6 is controlled, thereby simulatively producing a knock detecting condition. Furthermore, through not previously stated, the fail-safe circuit for detecting an abnormal operation level of the acceleration sensor 1 and the output signal line or the noise level detector 5 and the signal level of each of these parts is operated to simulatively generate an output from the knock detecting section 120.

This output is received by the knock detecting section check circuit 123 of the igniter section 122. This knock detecting section check circuit 123 functions to detect the operation of each part of the knock detecting section 120 and the normal condition of the signal line between the knock detecting section 120 and the igniter 122 if there exists the control signal from the knock detecting section 120 when supplied with the output of the knock no-control range detector 121. In this case, the engine is operating in the knock no-control range, it is desirable, from the respect of fuel economy, to cancel the control signal from the knock detecting section 120 so that it will not go into the phase shifter 8 (in the deceleration range it is not needed to cancel the control signal as it is harmless in this range).

Figure 9:
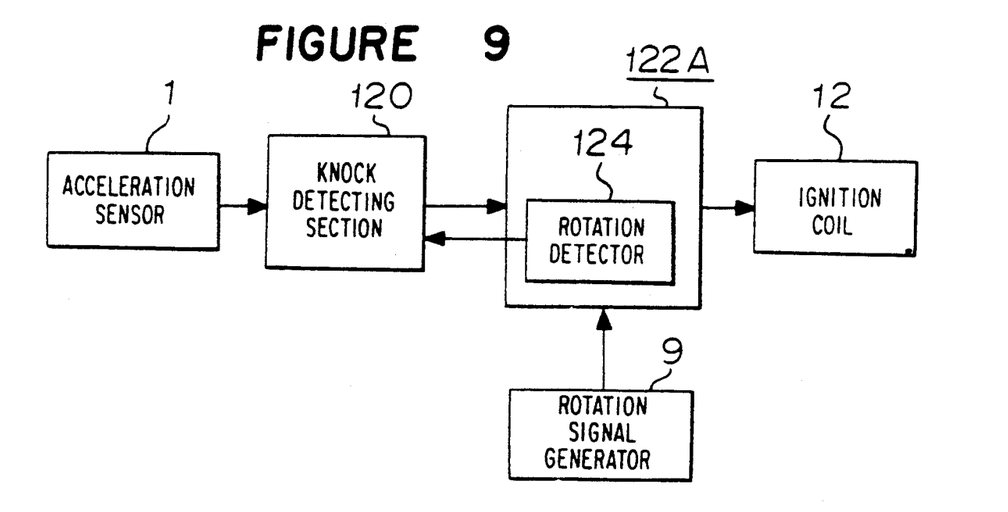
FIGS. 9 and 10 are block diagrams of the ignition timing control apparatus of internal-combustion engine of another embodiment of the present invention.

FIG. 9 shows the knock no-control range set in accordance with the engine speed. In this drawing, a numeral 124 designates a rotation detector, which is built in the igniter section 122A. The igniter section 122A is a version of the igniter 122 of FIG. 8 added with the function of the rotation detector 124. When the rotation detector 124 has detected the knock no-control range, the operating condition of the circuit of each part in the knock detecting section 120 which is equivalent to that shown in FIG. 8, and an abnormality of the signal line between the knock detecting section 120 and the igniter section 122A can be judged. It is judged normal when the control signal from the knock detector 120 can be received at the time of no-knock control.

Figure 10:
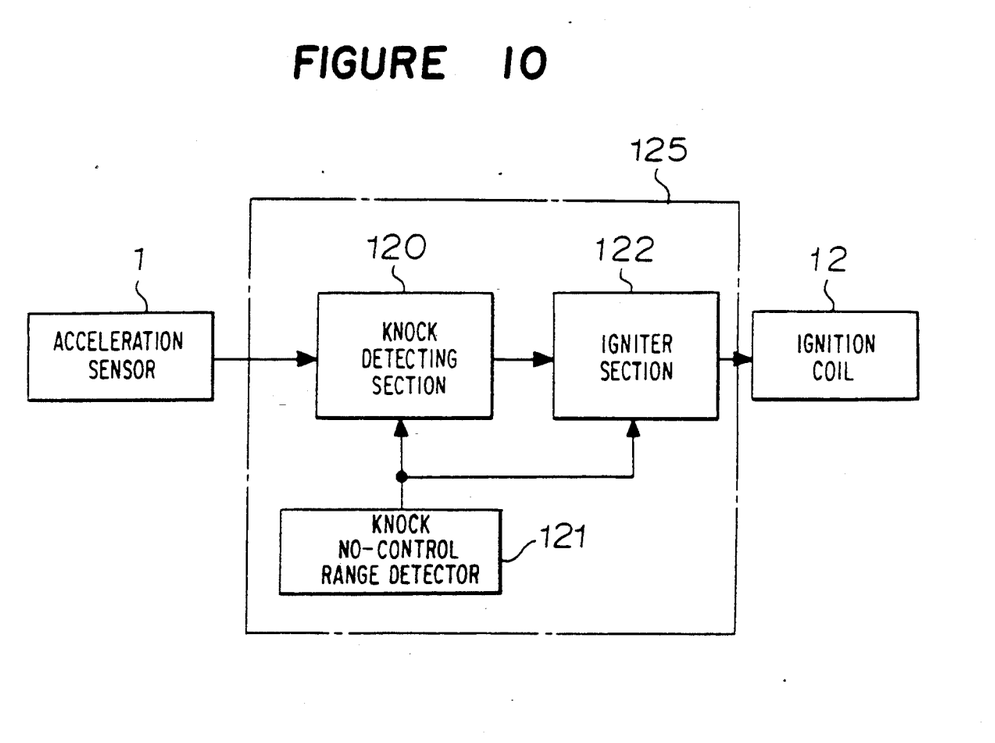

FIG. 10 shows an integrated control system using an especially popular microcomputer (a system whose major function includes the control of the quantity of fuel supplied and ignition timing) comprising a computer unit 125 having a knock detecting section 120 (composed of for example a thick-film hybrid IC), an igniter section 122 and the knock no-control range detector 121 which are composed of by the use a computer. FIG. 10 shows a system having a much more important function with higher control accuracy and a sophisticated mechanism than those shown in FIGS. 8 and 9, and therefore the detection of abnormality occurring with the system is very important. performing the abnormality check of the knock detecting section 120 can make the operation check of the thick-film hybrid IC and the abnormality check of the signal line between the knock detecting section 120 and the igniter section 122 using a computer.

According to the embodiment of the present invention, as described above, the control device has the effect that, in the knock control range, the knock control can be done and, in the no-knock control range, the detection of abnormality of the circuit of each part of the knock detecting section and the signal line between the knock detecting section and the igniter section can be performed in accordance with of one kind of knock control signal from the knock detecting section through one signal line.

Also the system using the computer has the effect of proper and positive self-diagnosis of the control function and system performance by the use of the abnormality detecting function of the knock detecting section.

While only certain embodiments of the present invention have been described, it will be apparent to those skilled in the art that various changes and modifications may be made therein without departing from the spirit and scope of the present invention as claimed.

What is claimed is:

1. An ignition timing control apparatus for an internal-combustion engine, comprising: a resonance-type acceleration sensor for detecting vibration acceleration; a discriminating means for eliminating noise signal components from an output of said acceleration sensor, and selecting knocking signal components; a reference ignition timing signal generating means for generating a reference ignition timing signal; a phase shifting means for changing the phase of the reference ignition timing signal in accordance with an output of said discriminating means; a switching means for interrupting a power supply to an ignition coil in accordance with an output of said phase shifting means; and an operating condition detecting means for applying a specific voltage to said acceleration sensor and, based on the responsiveness of said acceleration sensor to said specific voltage, verifying the operating condition of said acceleration sensor and the integrity of a circuit connection between an output of said acceleration sensor and an input of said discriminating means.

* * * * *